United States Patent
Muehlfeld et al.

(10) Patent No.: US 11,393,193 B1
(45) Date of Patent: Jul. 19, 2022

(54) ZONE MANAGEMENT GENERATION FROM POINT SAMPLES

(71) Applicant: Sentera, Inc., Minneapolis, MN (US)

(72) Inventors: Andrew Muehlfeld, Minneapolis, MN (US); Joseph Franck, Minneapolis, MN (US); Devon Libby, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 376 days.

(21) Appl. No.: 16/654,806

(22) Filed: Oct. 16, 2019

(51) Int. Cl.
| | |
|---|---|
| *G06T 17/20* | (2006.01) |
| *G06T 7/70* | (2017.01) |
| *B64C 39/02* | (2006.01) |
| *G05D 1/00* | (2006.01) |
| *G08G 5/00* | (2006.01) |
| *G06V 20/00* | (2022.01) |
| *G06V 20/10* | (2022.01) |

(52) U.S. Cl.
CPC .......... *G06V 20/188* (2022.01); *B64C 39/024* (2013.01); *G05D 1/0088* (2013.01); *G06T 7/70* (2017.01); *G06T 17/20* (2013.01); *G08G 5/0039* (2013.01); *B64C 2201/127* (2013.01); *G06T 2207/10032* (2013.01); *G06T 2207/30188* (2013.01)

(58) Field of Classification Search
CPC ........ G06K 9/00657; G06K 9/00; G06K 9/42; B64C 39/024; B64C 2201/127; B64C 39/02; G05D 1/0088; G05D 1/00; G06T 7/70; G06T 17/20; G06T 2207/10032; G06T 2207/30188; G06T 1/00; G08G 5/0039; G08G 5/00; G01B 11/00
See application file for complete search history.

(56) References Cited

U.S. PATENT DOCUMENTS

| | | | |
|---|---|---|---|
| 10,719,638 B2 * | 7/2020 | Xu | ........................... G06F 7/02 |
| 2018/0018517 A1 * | 1/2018 | Zhong | ................ G06K 9/00657 |
| 2018/0146624 A1 * | 5/2018 | Chen | ........................ A01G 7/00 |

* cited by examiner

*Primary Examiner* — Yonel Beaulieu
(74) *Attorney, Agent, or Firm* — Hamre, Schumann, Mueller & Larson, P.C.

(57) ABSTRACT

An agricultural zone management system and methods where agricultural management zones can be generated based on point samples generated from images of a field. The images can be captured by a camera on a UAV flown over the field. The point samples are used to generate the management zones of the agricultural field, where each management zone encompasses at least one of the point samples. The management zones are then stored in at least one non-transitory computer readable storage medium. The management zones can then be used to, for example, treat the field using a prescription that has been developed for each management zone, make yield predictions of a crop grown or to be grown in the field, perform analysis of crops or soil in the field, make plans for the future use of the field, and others.

16 Claims, 10 Drawing Sheets

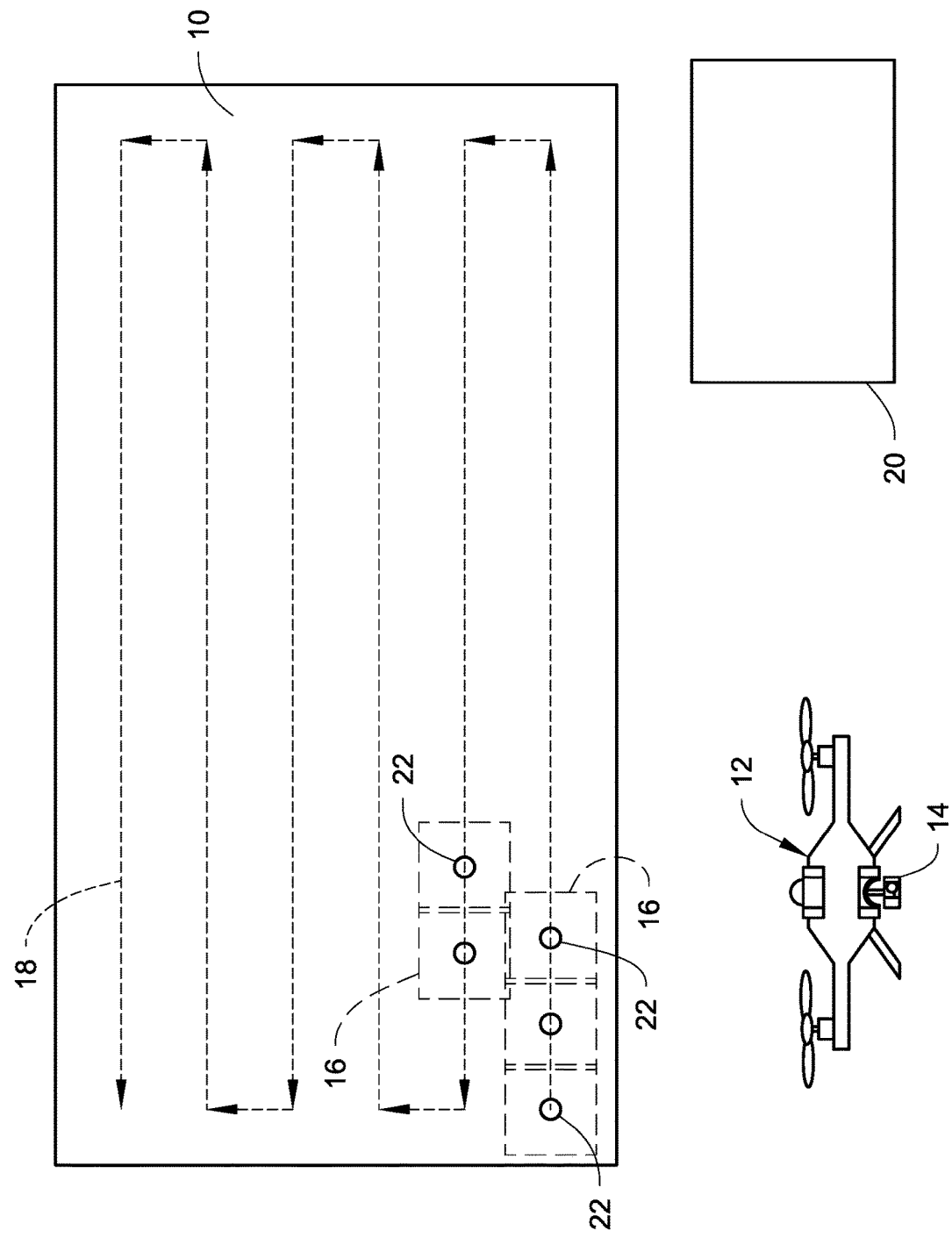

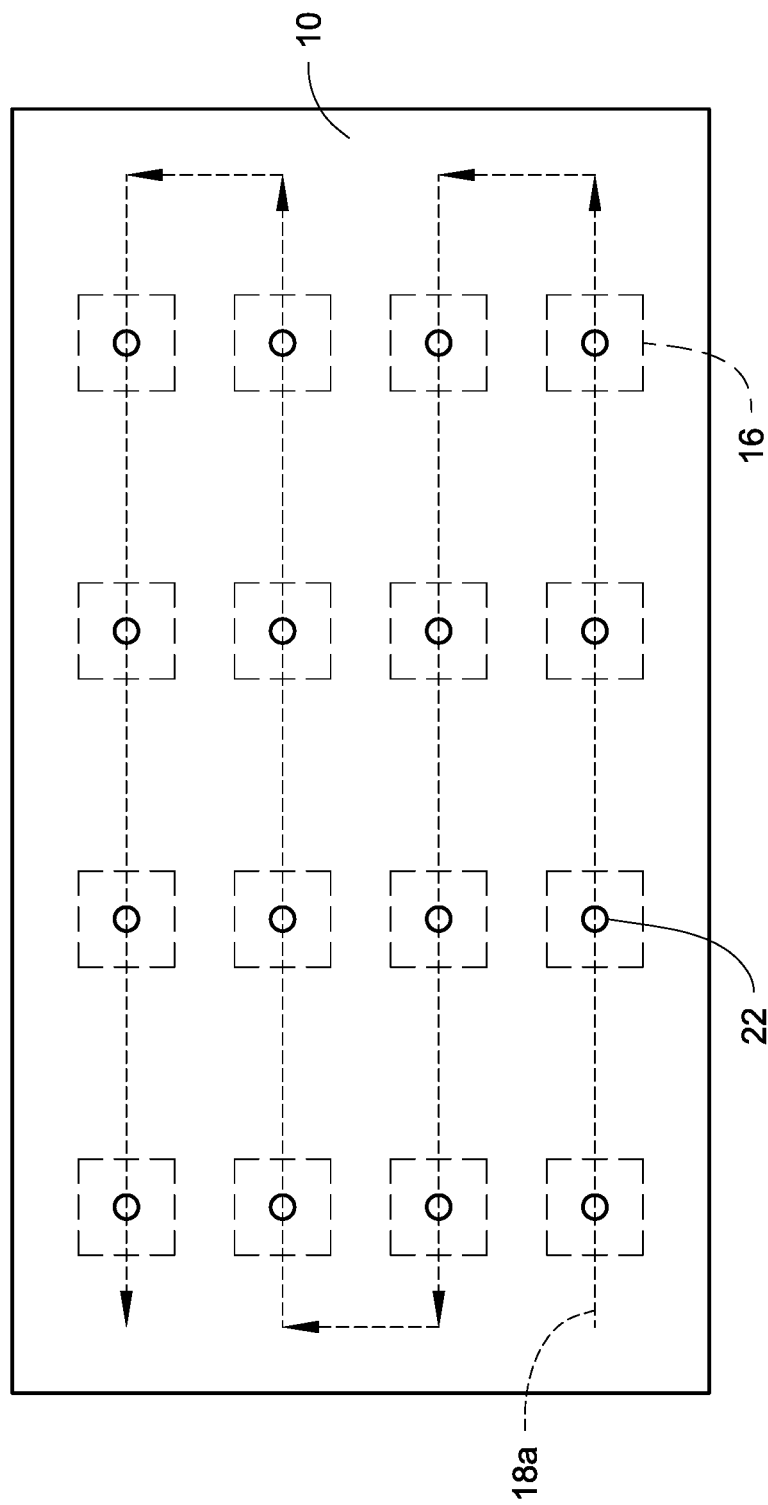

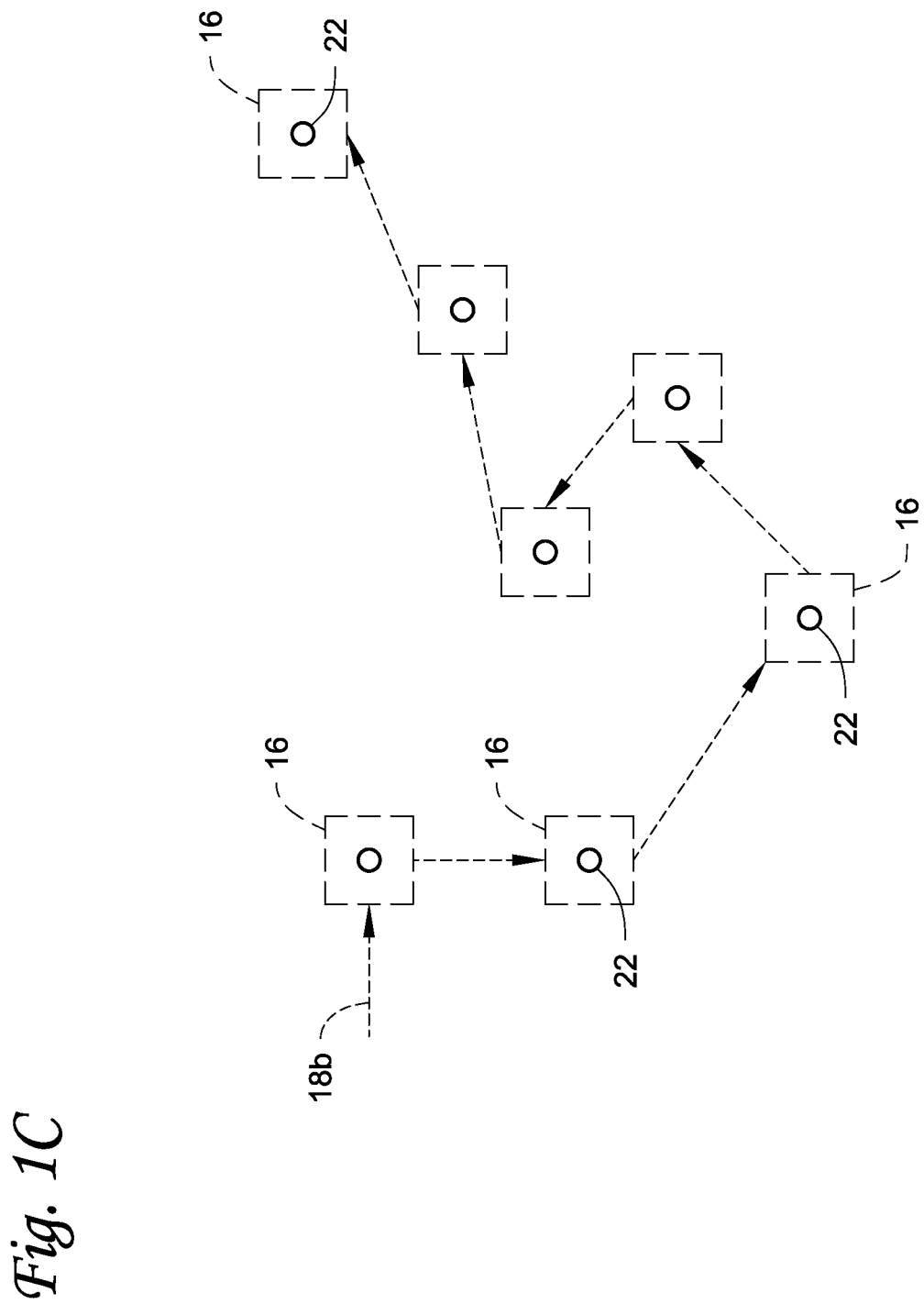

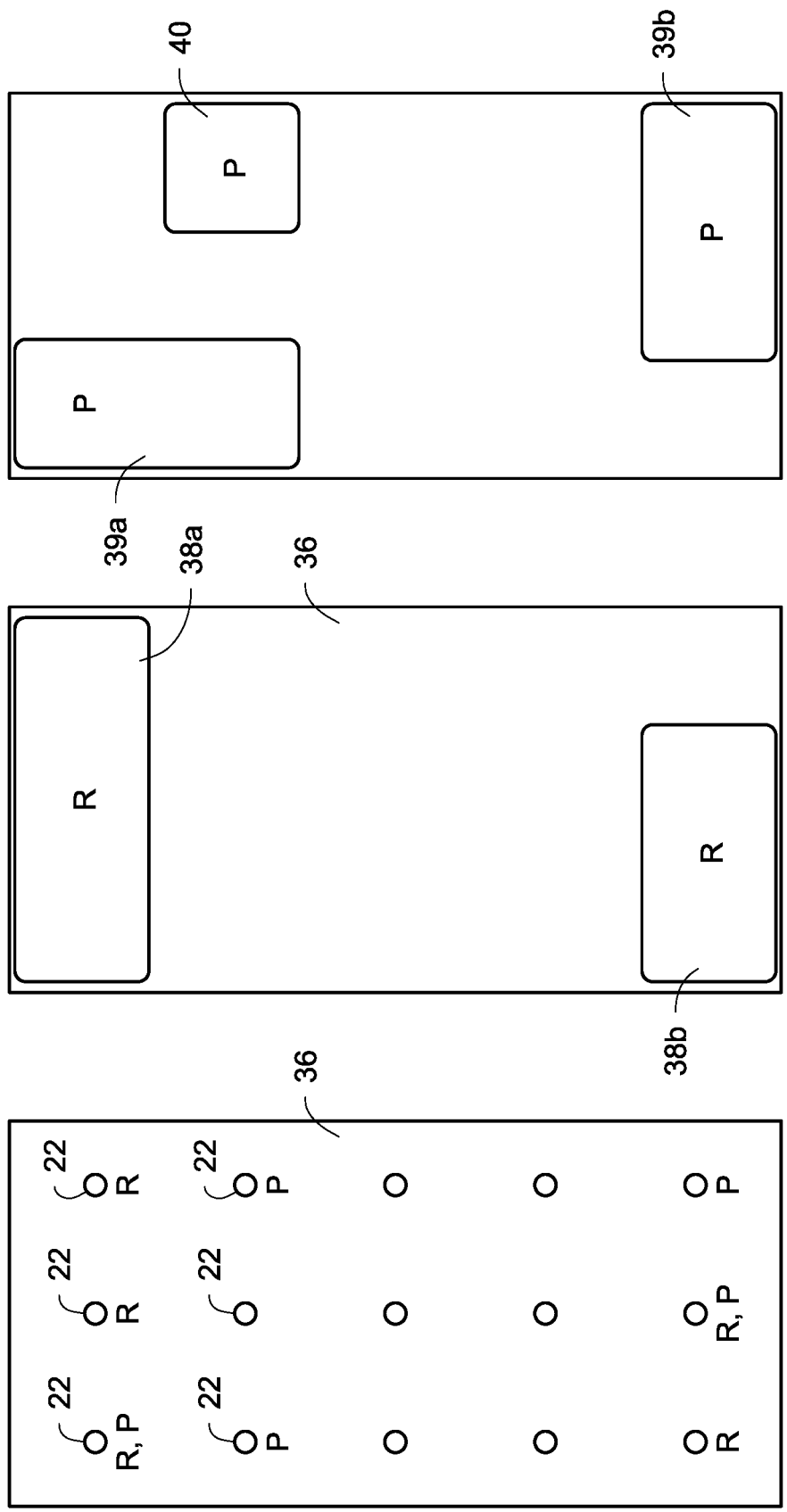

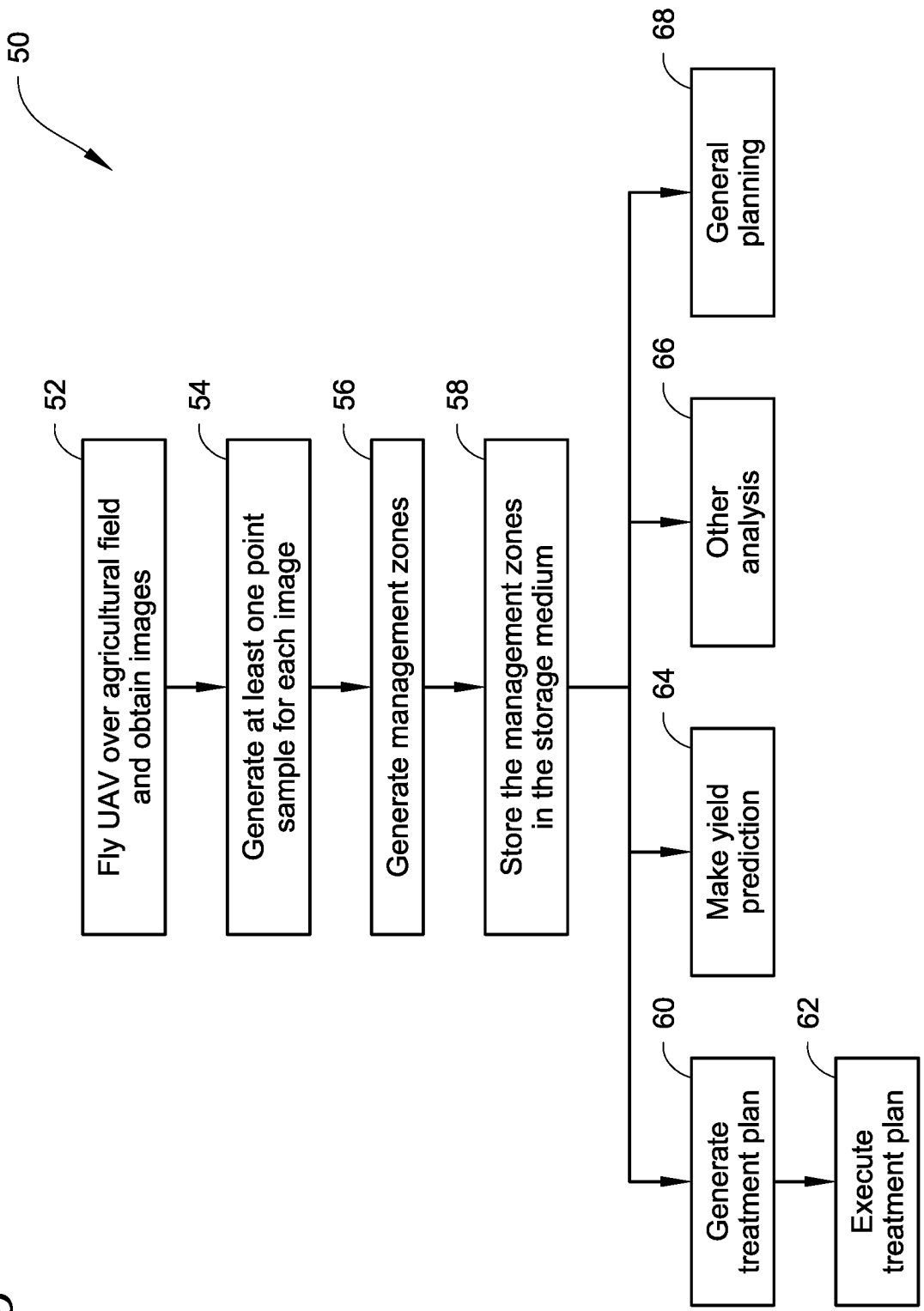

ZONE MANAGEMENT GENERATION FROM POINT SAMPLES

FIELD

This disclosure relates to agricultural zone management systems and generating management zones for agricultural fields. The management zones can be used for a number of purposes including, but not limited to, making treatment plans, making yield predictions, performing analysis, planning for the future, and others.

BACKGROUND

Current advanced farming techniques employed in precision agriculture use management zones to apply different treatments (for example, fertilizer, fungicide, herbicide, planting or the like) to different regions of a field, to make yield predictions, perform analysis of the field, make plans for the future, and the like. Management zones are often generated based on soil types, soil organic matter, and terrain variation of the field.

Management zone maps can be generated from government developed soil type maps, terrain models, or other static information. They can also be generated from aerial imagery, such as crop health maps like normalized difference vegetation index (NDVI) derived from images obtained from unmanned aerial vehicles (UAVs). Current methods for generating management zone maps from aerial imagery rely on creating a raster image of the whole field and analyzing pixels of the raster image.

SUMMARY

An agricultural zone management system and methods are described where agricultural management zones can be generated based on point samples generated from images of the agricultural field. The images can be captured by a camera on a UAV that is flown over the field.

In many cases, a statistical sampling of an agricultural field is sufficient for understanding what is happening in the agricultural field. Accordingly, for each image a point sample is generated. The point samples form a statistical sampling of the field. The management zones are then generated from the point samples.

The UAV can be flown over the field in any number of flight patterns to generate the desired images. In one embodiment, a conventional mapping UAV flight pattern can be flown to obtain a full set of images, with or without positive overlap of the images, of the entire field with each image being processed as a point sample as described herein. In still another embodiment, a conventional mapping UAV flight pattern can be flown to obtain a full set of images, with or without positive overlap of the images, of the entire field, but only a subset or sampling of the obtained images being processed as a point sample as described herein. In still another embodiment, a conventional mapping UAV flight pattern can be flown, but the camera on the UAV can be controlled to obtain a sparse set of images rather than a full set of images.

In another embodiment, the UAV can be flown in a spot flight pattern over the field to capture spot images of the field. In contrast to a conventional mapping UAV flight pattern, the spot flight pattern of the UAV captures a sparse set of images. The spot flight pattern can be, for example, a grid spot flight pattern or a points of interest spot flight pattern. The spot flight pattern has a faster coverage rate of the field compared to a full raster mapping flight pattern, requiring shorter flight times thereby making it attractive for scaling agriculture operations. The spot flight pattern is used to obtain a statistical sampling of the field, and the spot flight pattern may or may not cover the entire area of the field. The spot flight pattern enables more detailed (i.e. higher resolution) images to be captured and collected, which is not practical with image capture that is intended for 100% coverage of the field. Further, rather than producing a raster map, the statistical sampling resulting from the spot flight pattern described herein produces a set of points distributed throughout the field.

In one embodiment described herein, a method of generating management zones of an agricultural field can include processing images of the agricultural field that have been obtained by an unmanned aerial vehicle to generate point samples of the agricultural field. The point samples are then used to generate the management zones of the agricultural field, where each management zone encompasses at least one of the point samples. The management zones are then stored in at least one non-transitory computer readable storage medium. The management zones can be used to, for example, treat the field using a prescription that has been developed for each management zone, make yield predictions of a crop grown or to be grown in the field, perform analysis of crops or soil, make plans for the future use of the field, and others.

The images can be processed to produce one or more point samples associated with each processed image. The point samples can be an agronomic numeric value or quantification relating to an agronomic feature of agronomic importance with each image. Examples of agronomic features that can be used to generate the agronomic numeric values include, but are not limited to: crop plant count; tassel count; nutrient deficient leaf count; crop health; disease; pests; defoliation; weed count (i.e. a weed pressure score; weed presence (i.e. yes or no); weed species identification (i.e. which weeds are present); weed species count (i.e. how many of each type of weed are present); flower quantification or count; vegetation coverage fraction; multispectral index values such as NDVI; and others.

In one particular application of the technology described herein, the images can be used to detect the presence of different weed species appearing in each image. This detection can be used to, for example, determine whether weed species are present and/or identify any weed species that are present and/or produce a count of each weed specie in each image. A management zone layer for each weed specie can then be developed. Each management zone layer can be a set of management zones covering the agricultural field based on the count of a weed specie in each image. In one embodiment, a plurality of management zone layers can be developed, each management zone layer corresponding to one weed specie, and each management zone layer can be used as a prescription to apply different herbicides for the different weed species

DRAWINGS

FIG. 1A schematically illustrates an example of an agricultural field together with a conventional mapping UAV fight pattern depicted on the field, used to generate point samples as described herein.

FIG. 1B illustrates an example of an agricultural field together with a grid spot flight pattern depicted on the field, used to generate point samples as described herein.

FIG. 1C illustrates a points of interest spot flight pattern that can be flown by the UAV.

FIGS. 4A, 4B and 4C illustrate the concept of generating management zone layers for each weed specie in a field.

FIG. 5 illustrates one example of a method of generating management zones described herein.

DETAILED DESCRIPTION

Figure 2A:
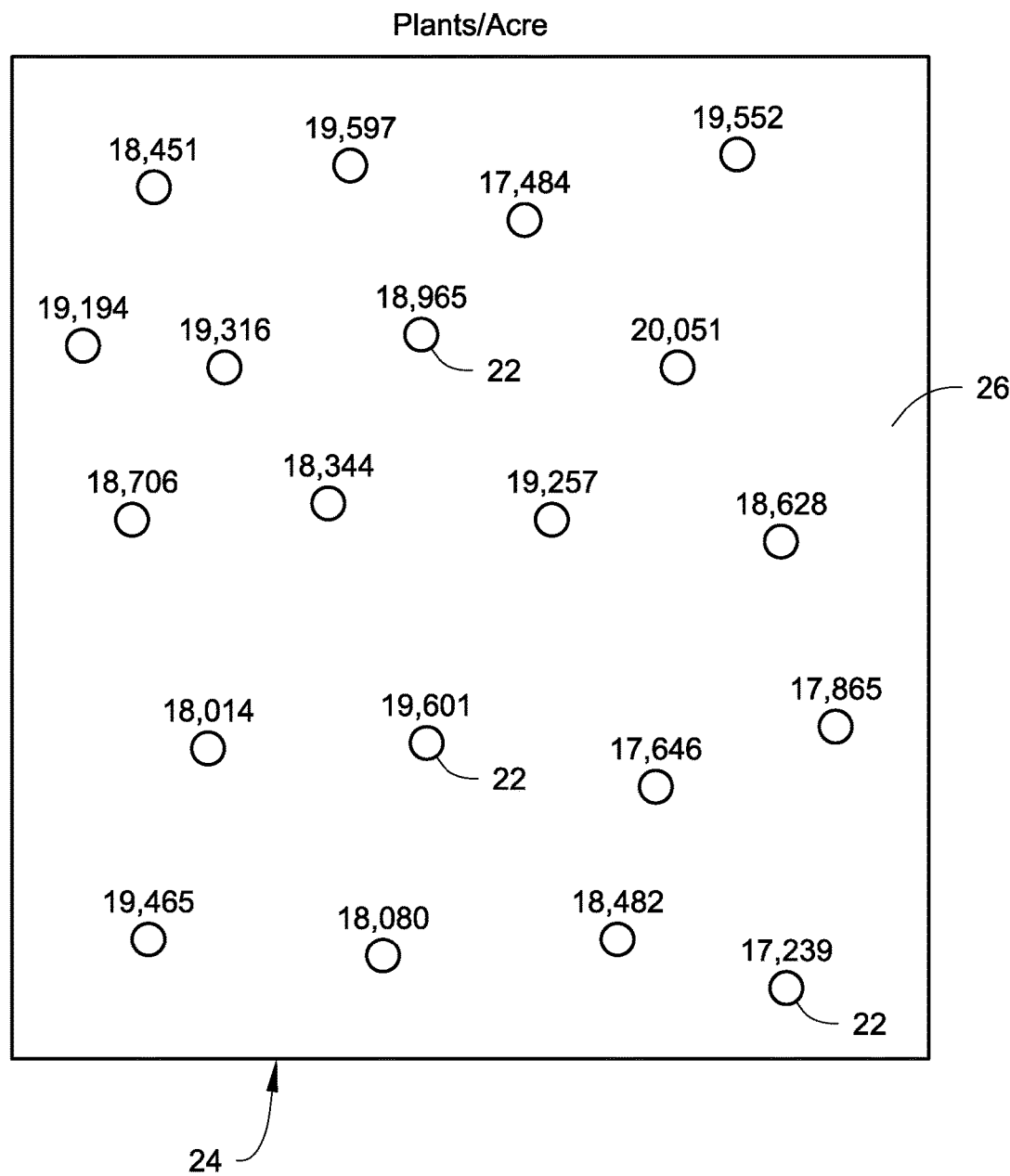
FIGS. 2A and 2B depict examples of generated point samples described herein on a display of an agricultural field.

The following describes an agricultural zone management system and methods where agricultural management zones can be generated based on point samples that are generated from images captured by a camera on a UAV that is flown over the agricultural field. The UAV can be flown in any suitable flight pattern for capturing the images, for example a conventional mapping UAV flight pattern or in a spot flight pattern. The management zones can be used to, for example, treat the field using a prescription that has been developed for each management zone, make yield predictions of a crop grown or to be grown in the field, perform analysis of crops or soil, make plans for the future use of the field, and others.

A management zone as used herein refers to a sub-part of an agricultural field being farmed with a size (i.e. area or square footage) that is less than the entire area of the agricultural field. The agricultural field will typically include a plurality of management zones which, when added together, approximately equal the area of the agricultural field being farmed. Areas within a field that are not farmed, such as a stand of trees or a waterway such as a pond or a creek, are not part of the management zone or the area of the agricultural field. The management zones may have different sizes. The management zones may overlap one another (some or all of the management zones could overlap) or there could be gaps between the management zones (there could be gaps between all or some of the management zones).

An agricultural zone management system as used herein refers to elements useable in precision agriculture to develop, store, display, analyze, and/or implement the management zones. The agricultural zone management system can include, but is not limited to, a UAV; a non-transitory computer readable storage medium on which the management zones described herein are stored or saved; one or more processors for example, central processing units (CPUs), graphic processing units (GPUs) or both, processor cores, compute nodes, etc., that can process the images of the agricultural field to generate the point samples described herein, generate the management zones described herein, and generate and display the management zone map described herein.

As indicated above, in one embodiment a treatment plan or prescription can be generated for each management zone. A treatment plan refers to a plan that is developed for treating the agricultural field within each management zone. A treatment plan can be a treatment rate suitable for the associated management zone, for example a rate at which a material is applied to the soil or to crops growing in the soil in the management zone, or a rate at which seeds are planted, or a rate at which plants are planted. A treatment plan could also dictate how soil is tilled in the associated management zone, such as the depth of tilling. The treatment plan can encompass any type of treatment that one may wish to conduct within each associated management zone. Treatments encompassed by the techniques described herein include, but are not limited to: fertilizing; seeding; herbicide application; pesticide application; planting/no planting; fungicide application; tilling; watering; and harvesting. The treatment plan can also enable and/or disable treatment in the associated management zone.

In another embodiment, the management zones can be used to make a yield prediction of a crop grown or to be grown in the field. For example, each management zone can indicate a density (plants per acre) of plants in the respective zone or indicate total plants (which could be derived from knowing the density and the area of the respective management zone) in the respective zone. Plant density could be derived from, for example, a population count of the plants, NDVI, or a tassel count. For some or all of the management zones, a yield per plant can then be estimated. The yield prediction can then be determined by multiplying the yield per plant by the number of plants in each management zone. When determining the yield prediction, the order of operations can be varied. For example, the yield per acre in each management zone can be estimated, followed by summing the product of each management zone's area and the estimated yield per acre.

Referring to FIG. 1A, an example of an agricultural field 10 is illustrated together with a UAV 12 that can fly over the field 10 and collect images using a camera 14. The UAV 12 is used to generate a statistical sampling of the agricultural field 10 in order to analyze what is happening in the agricultural field 10. In this illustrated embodiment, the UAV 12 is flown over the field 10 in what can be referred to as a conventional mapping flight pattern 18 to capture images 16 of the field 10. For example, FIG. 1 depicts in dashed lines an example of the area (or field of view) of each image 16 determined by the field of view of the camera 14. The conventional mapping flight pattern is such that the entire field 10 is covered by the images 16 and the total area of the images 16 is generally equal to the total area of the field 10. The images 16 can overlap one another as illustrated, or there may be no overlap between the images 16. The UAV 12 can be controlled, automatically or manually, to fly the mapping flight pattern 18 with the images 16 being captured as the UAV 12 traverses along the flight pattern 18.

As discussed further below, each one of the captured images 16 can be analyzed and processed to generate a point sample associated with each image 16 that is used to generate the management zones. In another embodiment, some of the captured images 16 can be discarded (i.e. not processed or analyzed) with point samples generated for the remaining sub-set of the images 16. In another embodiment, each image, or a sub-set of the images, can be broken into two or more sub-images, and a point sample can be generated for each sub-image.

FIG. 1B illustrates another embodiment where the UAV flies a spot flight pattern 18a (indicated by the dashed lines) and captures a sparse set of spot images 16 covering less than the entire area of the field 10. In this example, the actual path of the UAV can be identical to the flight path in FIG. 1A, but the camera is only triggered at desired locations. The locations can be evenly spaced or randomly spaced along the flight path 18a. In this embodiment, the area of each spot image 16 is less than the total area of the field 10, and the total area of the spot images 16 is less than the total area of the field 10.

FIG. 1C illustrates another embodiment where the UAV is controlled to fly a spot flight pattern in the form of a "locations of interest" spot flight pattern 18b to capture the spot images 16. In the spot flight pattern 18b, the UAV flies to specific, selected locations of interest to capture the spot images 16 at each location. The selected locations can be based on known information about the field (for example, known trouble spots together with known normal spots). Examples of known trouble spots can include, but are not limited to, areas typically having weeds, a low elevation spot, a hill top, different soil locations, locations with standing water, waterways, and the like. Normal spots are spots where crops are known to grow without specific trouble. The locations are typically randomly spaced and the flight pattern 18b can be irregular. In this embodiment, the area of each spot image 16 is less than the total area of the field 10, and the total area of the spot images 16 is less than the total area of the field 10.

In another embodiment, it is possible to combine the patterns in FIGS. 1A, 1B and 1C. For example, the UAV can be controlled to fly a flight pattern that includes locations of interest (like in FIG. 1C) and other regions of the agricultural field can be covered using a flight pattern as in FIGS. 1A and/or 1B. For example, the UAV can be controlled to fly to a low spot to capture one or more spot images, fly to a high spot to capture one or more spot images, fly to a normal spot to capture one or more spot images, and also fly a conventional mapping flight pattern over other parts of the field.

Regardless of the type of flight pattern that is flown, the captured images 16 can then be analyzed and processed to generate point samples 22. In one embodiment, the images 16 can be analyzed on the UAV 12, one by one as they obtained or collectively after all of the images 16 have been obtained. In another embodiment, the images 16 can be transmitted wirelessly in real time, individually as they are obtained or as a batch after they are all obtained, to and analyzed at a remote computing device 20. In another embodiment, the images 16 can be stored on the UAV 12, and then downloaded to the remote computing device 20 once the UAV 12 lands for example using a USB storage device onto which the images 16 are downloaded from the UAV 12 or a removable storage device such as an SD card on the UAV 12.

The analysis generates at least one point sample 22 for each image 16. Each point sample 22 can be an agronomic numeric value or quantification, or identification, relating to an agronomic feature of agronomic importance within the field of view of each image 16. Examples of agronomic features that can be used generate the point samples 22 include, but are not limited to, crop plant count; tassel count; nutrient deficient leaf count (for example nitrogen deficient leaf count; potassium deficient leaf count; phosphorous deficient leaf count; magnesium deficient leaf count; and other nutrients could be identified separately); crop health; disease; pests; defoliation; weed count (i.e. a weed pressure score; weed presence (i.e. yes or no); weed species identification (i.e. which weeds are present); weed species quantification or count (i.e. how many of each type of weed are present); flower quantification or count; vegetation coverage fraction; multispectral index values such as NDVI; and others. For example, each point sample 22 can be a numerical value of the absolute/total number or density of plants within each image 16; a numerical value of the absolute number or density of tassels of corn within each image 16; a numerical value of the absolute number or density of different types of nutrient deficient leaves within each image 16 as well as the type of nutrient; a numerical value of the absolute number or density of weeds within each image 16; a suitable identifier, which could be alphanumeric, a symbol, a color, and any combinations thereof, that identifies or indicates a health of the crops and/or soil in each image 16, any disease(s) of crops and/or soil in each image 16, pests in each image 16, defoliation in each image 16, the presence of weeds and/or the identification of weeds in each image 16. Many other point samples 22 are possible. The generated point samples 22 can be positioned and displayed at a location corresponding to the center of each image 16. Alternatively, each image can be divided into one or more sub-images, and a point sample for each sub-image can be displayed, for example in the center of each sub-image.

One or more of the images 16 can be processed to produce different point samples 22 for the image. For example, the images 16 could be analyzed to produce two point samples 22, for example tassel count and a defoliation score, for each image 16. Separate management zone layers (described further below with respect to FIGS. 4A-C) can then be generated for the different types of point samples, for example one management zone layer for tassel count and one management zone layer for defoliation. Alternatively, the two point samples can be displayed together for each image.

The processing of the images 16 can be achieved using any suitable image processing techniques. One non-limiting example of image processing that can be used is disclosed in U.S. Patent Application Publication US 2019/0096033, which is incorporated by reference herein in its entirety.

FIG. 2A illustrates an example of a depiction or display 24 of a field 26 with a number of different examples of points samples 22 indicated on the display 24 that have been obtained from images of the field 26. In this example, each point sample 22 includes a numerical value that was obtained from a corresponding image captured by the camera. In this example, each numerical value is of the number of plants per acre in the corresponding images. In some embodiments, one or more additional point samples can be generated for each image, for example a defoliation score or defoliation indicator. The spot or point 22 is positioned at and displayed at a location corresponding to the center of its corresponding image. The geopositioning of the point samples on the field 26 is determined using known georeferencing techniques from geoposition data obtained by the UAV as it captures the images. Further information on georeferencing of images is disclosed in U.S. Patent Application Publication US 2019/0096033 the entire contents of which are incorporated herein by reference.

Figure 2B:
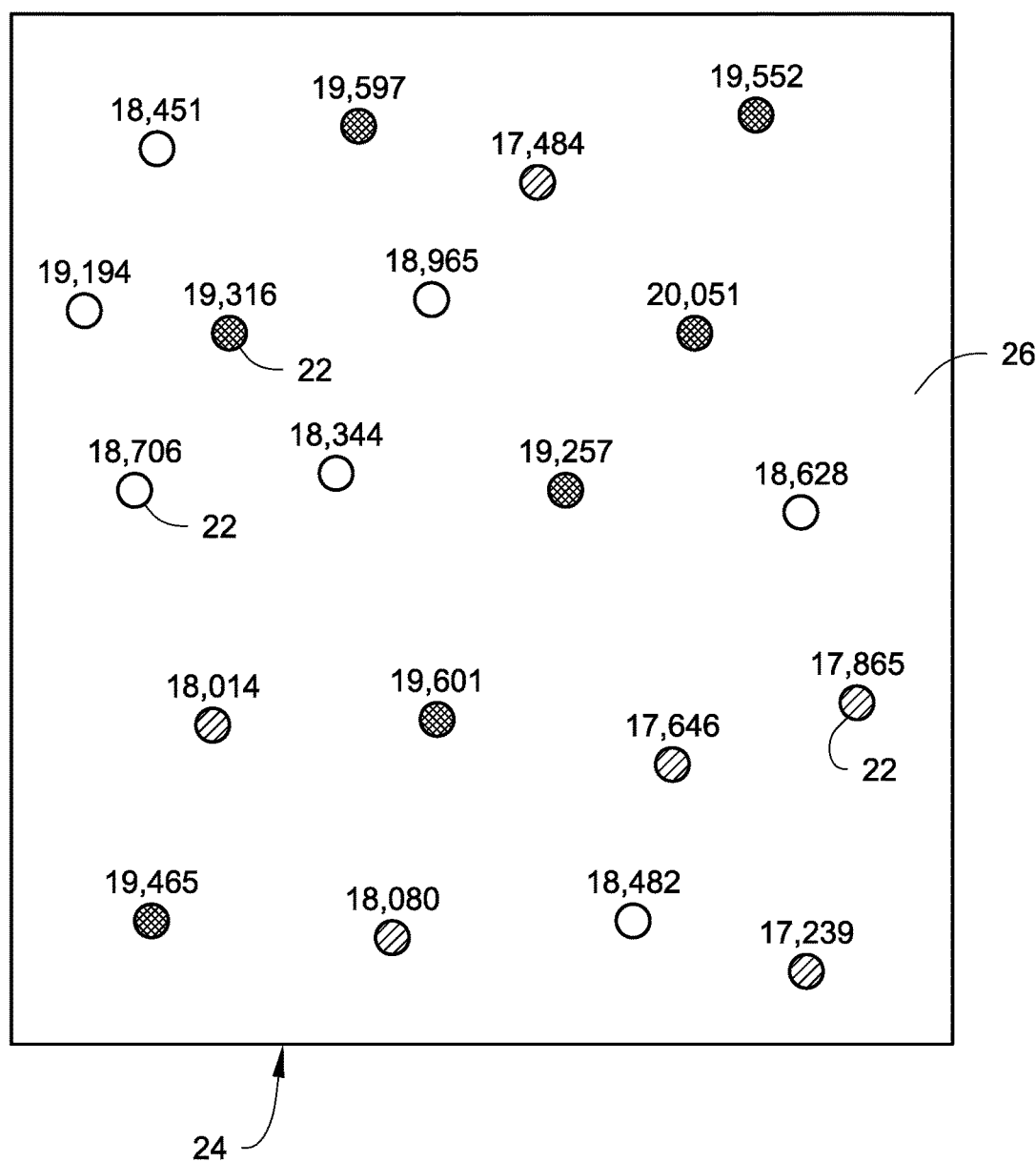

FIG. 2B is an illustration that is similar to FIG. 2A, but also showing the point samples 22 as being classified/grouped based on the indicated numerical value. The classification illustrated in FIG. 2B can be useful in combining resulting polygonal management zones as described further below. In FIG. 2B, the display 24 can include a table 28 on which the various classifications/groupings are indicated. For example, any of the point samples 22 with a density numerical value falling within a first minimum and a first maximum can be assigned a classification of 1, any of the point samples 22 with a density numerical value falling within a second minimum and a second maximum can be assigned a classification of 2, and any of the point samples 22 with a density numerical value falling within a third minimum and a third maximum can be assigned a classification of 3. In some embodiments, each classification can be assigned a color, and each point sample 22 falling within each classification can be illustrated in the corresponding color. Instead of, or in addition to using color, the different classifications can be differentiated by using different sizes for each point sample depending upon its classification, using different geometric shapes, or other differentiators. The point samples 22 can be grouped into any number of classes, from a minimum of two and up. In one non-limiting example, there can be three to five classes.

Once the point samples 22 are generated, the management zones of the agricultural field 10 are then generated. The management zones can be generated using any suitable technique that can use the point samples 22 to separate the field into management zones or regions. One example of a technique that can be used is Voronoi tessellation or a Voronoi diagram. The Voronoi tessellation technique is well known in the art. The Voronoi tessellation technique uses each point sample 22 to generate corresponding polygons that form the management zones.

Figure 3A:
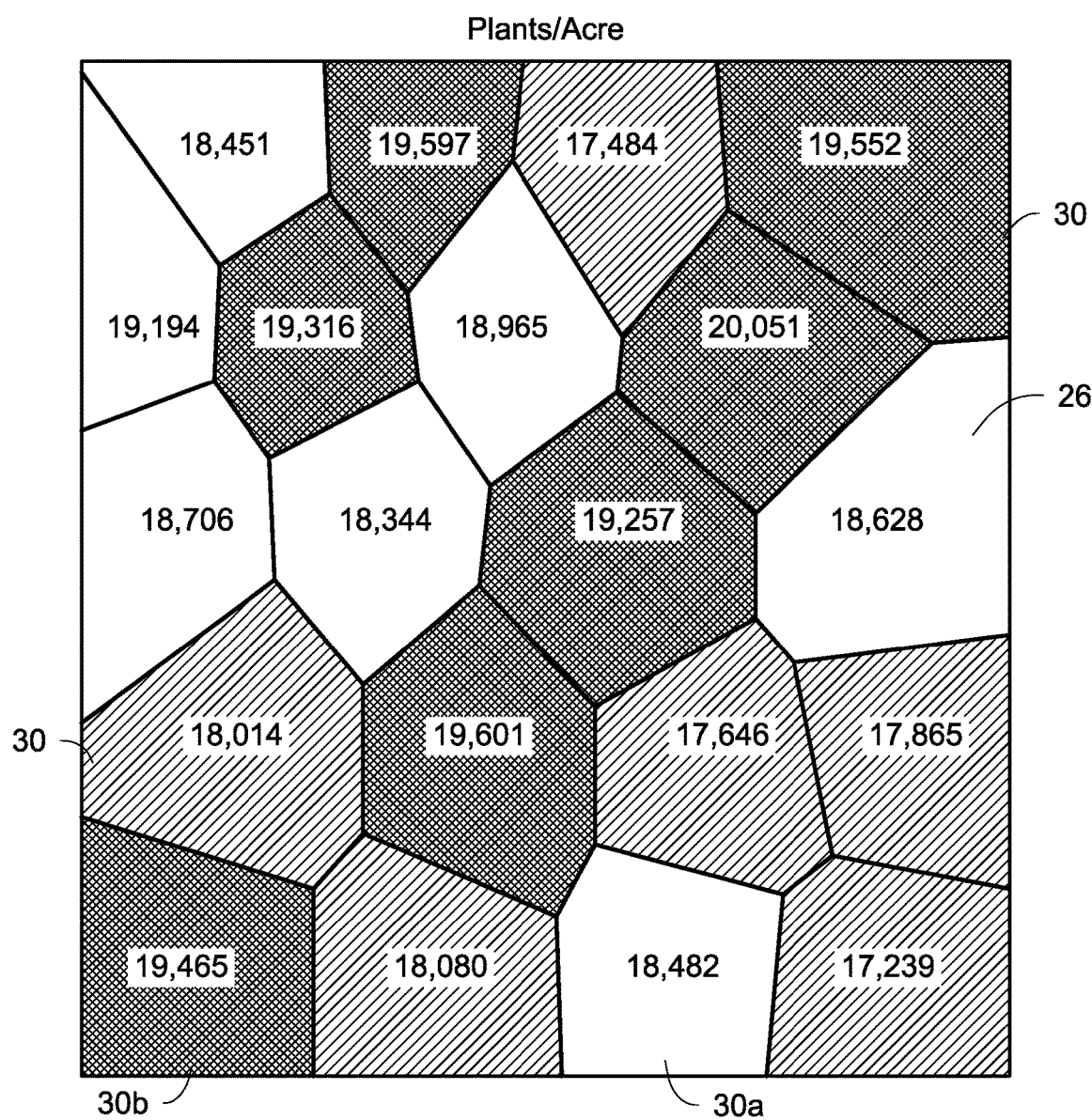
FIGS. 3A and 3B depict examples of zone maps with a plurality of management zones generated as described herein.

FIG. 3A illustrates an example of a displayed image with polygon management zones 30 that have been generated from the point samples in FIG. 2A using Voronoi tessellation, with the management zones 30 indicated on the field 26. In FIG. 3A, each management zone encompasses at least one of the point samples 22. However, the management zones can encompass any number of the point samples. As evident from FIG. 3A, the various management zones 30 have different sizes and shapes, but are each polygons. In this example, the plants per acre for each management zone 30 can also displayed on each management zone. For example, the management zone 30a has a plants per acre of 18,482, while the management zone 30b has a plants per acre of 19,465. The management zones 30 in FIG. 3A are also classified, for example in the same manner as the classifications in FIG. 2B.

In this example, the management zones 30 encompass a total area that generally equals the total area of the field 26. However, the management zones can encompass a total area that is slightly greater than the total area of the field 26. In addition, the management zones can encompass a total area that is less than the total area of the field 26.

Figure 3B:
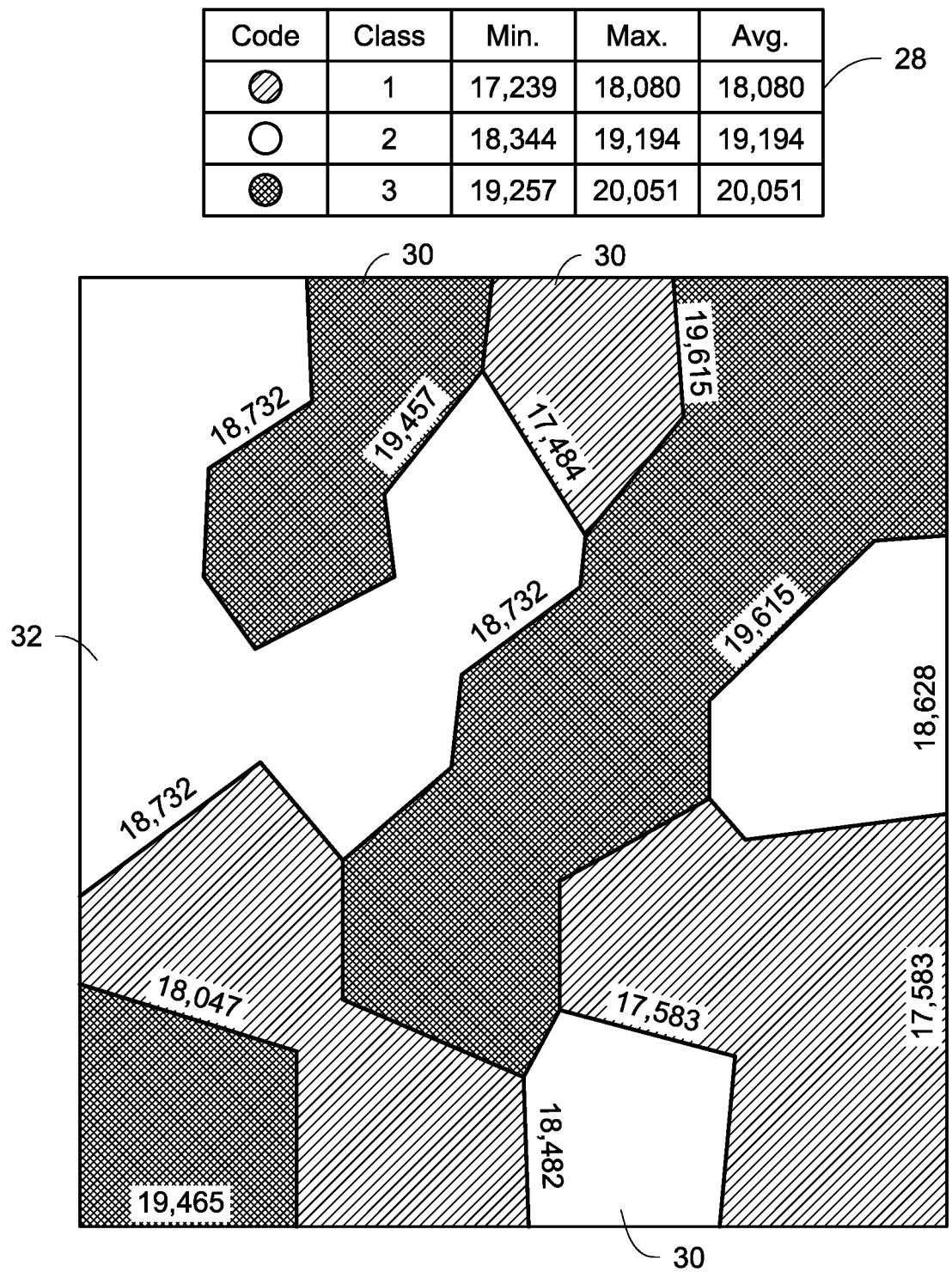

The Voronoi tessellation in FIG. 3A produces one polygon per point sample 22. In an optional step, adjacent polygonal management zones 30 with similar values can be optionally combined (i.e. dissolving the polygons). For example, FIG. 3B shows the result of combining adjacent polygonal management zones 30 in FIG. 3A that have the same classification. For example, the five adjacent polygon management zones with a classification of 2 can be combined to form a larger management zone 32. Any of the polygon management zones in FIG. 3A that are adjacent (i.e. border on or share a border) to one another and that have the same classification can be combined into a larger polygon management zone. If management zones are combined, the new numeric value displayed on the combined management zone can be a simple mean of the numeric value of all the point samples used to form the combined management zones, or a weighted average where each numeric value is weighted by the area of its polygon prior to polygon combination. If one management zone covered a small area and another management zone covered a large area, the numeric value associated with the larger area management zone can carry more weight in the weighted average. A polygon management zone that does not have a neighboring/bordering management zone with a same classification remains a single management zone derived from a single point sample. Like in FIG. 2B, FIG. 3B also depicts that the management zones 30 can be coded, for example color coded, to classify each management zone 30, and the table 28 is displayed on which the various classifications/groupings are indicated.

Another technique that could be used to combine the management zones is to use a raster interpolation method. In this technique, the points of the polygon management zones are converted to a raster using an interpolation method (such as, but not limited to, inverse distance weighting, triangulated irregular network, a Kriging method, and the like). A raster is a uniformly spaced grid of pixels, which can be thought of as an image with a numeric data value for each pixel instead of a color. The numeric values are continuous and can have any decimal value, or the numeric values can be discrete having integer values. The raster values are assigned to classes, for example three classes or five classes, using the same method as classifying the point samples in FIG. 2B or the polygon management zones. The classified raster is then converted back to a set of polygon management zones. In the conversion, contiguous pixels belonging to one class become one polygon. Information for each management zone can be generated by performing zonal statistics on the raster containing the continuous data produced in the raster conversion step described above. In the steps above, the "raster" could be substituted with "a grid of points generally denser than the point samples".

Regardless of the technique used to generate the management zones, the polygon management zones can be output in a suitable file format including, but not limited to, a management zone shapefile, a GeoJSON file, a geopackage file, a geodatabase file, or the like. The output file can be stored and/or exported for use. For example, the management zones can be used to export a report for viewing and/or printing. For example, the report can include a map of the management zones, with the point samples 22 indicated in each management zone. In addition, a table can be displayed on the zone map or separately from the zone map, that can indicate features such as: the point sample for each image along with GPS coordinates of each image; the point sample for each management zone with GPS coordinates of the zone centroid; or the point samples for management zone layer. The output file can also be used to generate a treatment plan for each management zone, make yield predictions for each management zone, for other analysis of the management zones, and general planning relating to the management zones.

As described above, different types of point samples can be generated for each image, and separate management zone layers can be generated for the different types of point samples. For example, FIG. 4A-4C, illustrate the concept of generating management zone layers based on different types of point samples. This example illustrates the use of different weed species identification in the field for generating the management zone layers. FIG. 4A illustrates point samples 22 that have been generated from images captured by the UAV flying over a field 36. Indicated on some of the point samples 22 are particular types of weed species (in this example, R for ragweed, and P for pigweed) identified in each image. In this example, the three adjacent point samples across the top of the field and two adjacent point samples along the bottom indicate that ragweed R is present, while various ones of the point samples 22 indicate pigweed P as being present. The remaining area of the field is devoid of ragweed and pigweed (or has ragweed and pigweed below a threshold).

FIG. 4B illustrates one management zone layer where the three adjacent point samples across the top of the field indicating the presence of ragweed R are combined into a single management zone 38a while the two adjacent point samples along the bottom indicating the presence of ragweed R are combined into a single management zone 38*b*. The remaining area(s) of the field can be considered a polygon with no ragweed (or ragweed below a threshold) present. In addition, FIG. 4C illustrates a second management zone layer where adjacent ones of the point samples indicating the presence of pigweed P are combined into management zones 39*a*, 39*b* while the single point sample indicating pigweed P forms its own management zone 40. The remaining area(s) of the field can be considered a polygon with no pigweed (or pigweed below a threshold) present.

With reference to FIG. 5, one embodiment of a method 50 of generating management zones of an agricultural field includes, at 52, flying the UAV over the agricultural field in a desired flight pattern and obtaining images of the field as described above. At 54, at least one point sample is generated for each image. Thereafter, at 56, the management zones are generated using the point samples, for examples using Voronoi tessellation as described above, and at 58 the management zones are stored in at least one non-transitory computer readable storage medium.

The stored management zones can then be used for a number of different purposes. For example, in one embodiment, the management zones can be used to, at 60, generate a treatment plan, one for each management zone, which treatment plan can then be executed at 62 by one or more farm implements. In another embodiment, the management zones can be used to, at 64, make a yield prediction for each management zone and thus for the entire field. In another embodiment, the management zones can be used for other analysis at 66, such as determining effectiveness of a previous treatment, determining overall health of a crop in the field, determining areas in a field where certain plants grow well and where they do not grow well, moisture levels in different parts of the field, comparison of regional trials within the field (e.g. comparing two or more different types of seed planted in different parts of the same field, different tillage practices, different fertilizer practices, different weed management practices, and the like). In still another embodiment, the management zones can be used for general planning at 68, such as a factor in decision making for next growing season including, but not limited to, what crop to grow next, whether to grow any crop next season, what type of seed to buy, seeding rate, what type of weed management program to execute, what type of tillage program to execute, what type of fertilizing program to execute, and the like; and helping to determine locations for ground based inspection or scouting, such as visual inspection, soil sampling, crop tissue sampling, or per-plant yield estimation.

Figure 6:
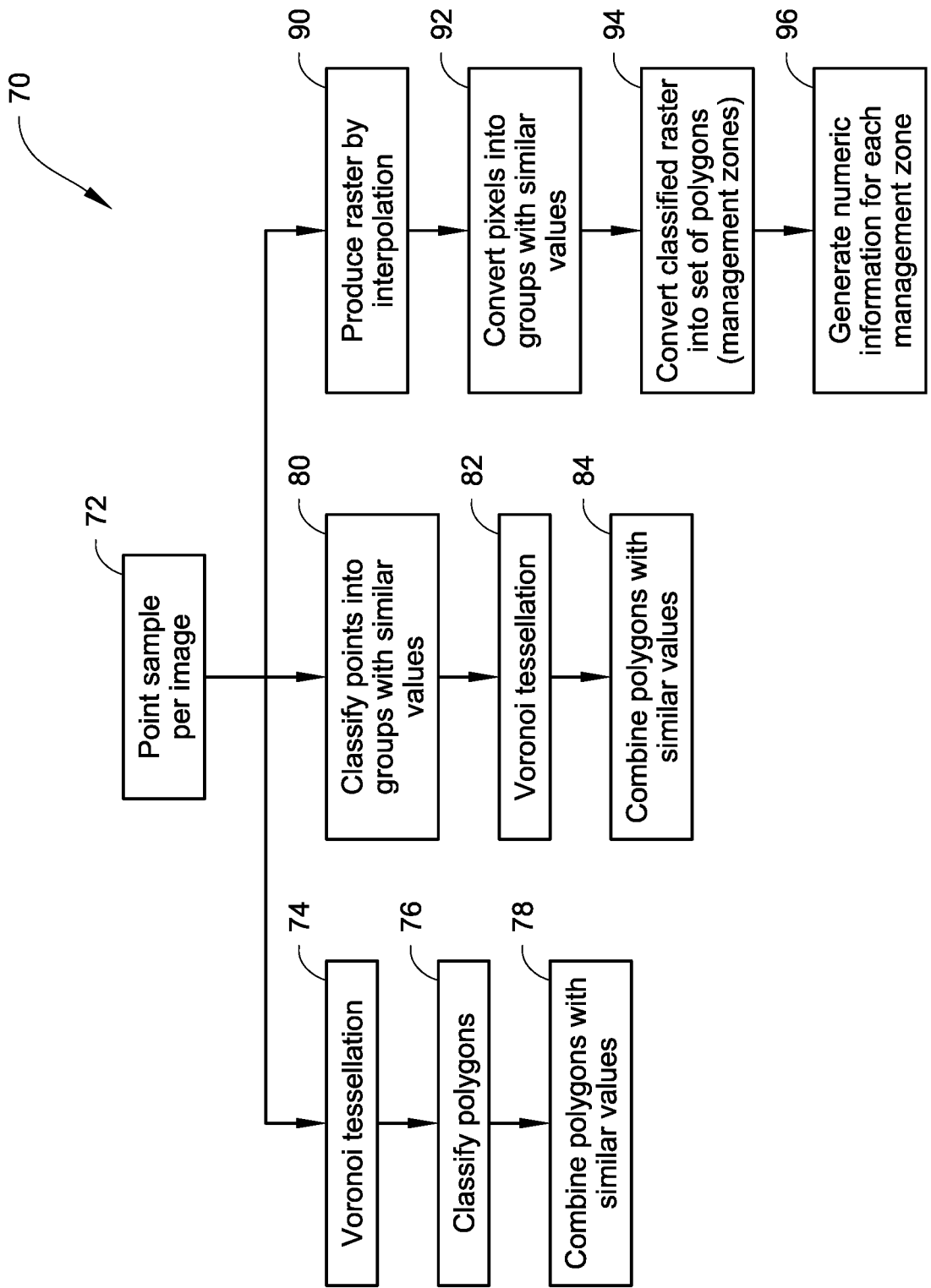
FIG. 6 illustrates example methods of generating management zones from point samples.

FIG. 6 depicts example methods 70 of generating management zones from point samples. At box 72, a point sample is generated for each image. The management zones can then be generated using one of the following techniques. At box 74, polygon management zones can be generated using Voronoi tessellation. The polygons can then be classified at 76 (for example in the manner illustrated in FIG. 3A), and then polygons with similar values can be combined at 78 to form larger polygon management zones.

With continued reference to FIG. 6, in an alternative method, point samples having similar values can be classified into groups at 80 as depicted in FIG. 2B. Polygon management zones can then be generated using Voronoi tessellation at 82. At 84, polygons with similar values can then be combined to form larger polygon management zones.

With continued reference to FIG. 6, in still another an alternative method, at 90 a raster can be produced from the point samples by interpolation. At 92, pixels in the raster can be classified into groups with similar values. The classified raster is then converted into a set of polygon management zones at 94. Thereafter, a numeric value, for example indicating plants per acre, can be generated for each management zone at 96. Optionally, management zones with similar values can be combined to form larger polygon management zones.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of generating management zones of an agricultural field, comprising:
   processing images of the agricultural field that have been obtained by an unmanned aerial vehicle to generate point samples of the agricultural field, wherein the images are obtained by flying the unmanned aerial vehicle in a mapping flight pattern to obtain a full set of images of the field wherein the agricultural field has a total area that is approximately equal to a total area covered by the full set of images;
   using the point samples to generate the management zones of the agricultural field, each management zone encompassing at least one of the point samples;
   storing the management zones in at least one non-transitory computer readable storage medium.

2. The method of claim 1, wherein the management zones are generated from the point samples using Voronoi tessellation or using an interpolation method.

3. A method of generating management zones of an agricultural field, comprising:
   processing images of the agricultural field that have been obtained by an unmanned aerial vehicle to generate point samples of the agricultural field, wherein the images are obtained by flying the unmanned aerial vehicle in a grid spot flight pattern over the agricultural field and/or in a points of interest spot flight pattern, and the images are spot images wherein the agricultural field has a total area that is greater than a total area covered by the spot images;
   using the point samples to generate the management zones of the agricultural field, each management zone encompassing at least one of the point samples;
   storing the management zones in at least one non-transitory computer readable storage medium.

4. A method of generating management zones of an agricultural field, comprising:
   processing images of the agricultural field that have been obtained by an unmanned aerial vehicle to generate point samples of the agricultural field;
   using the point samples to generate the management zones of the agricultural field, each management zone encompassing at least one of the point samples;
   storing the management zones in at least one non-transitory computer readable storage medium;
   wherein some of the management zones are derived from a single point sample and some of the management zones are derived from two or more of the point samples.

5. The method of claim 1, wherein each one of the point samples comprises one or more agronomic numeric values.

6. The method of claim 1, wherein each one of the point samples comprises a Boolean value relating to the agricultural field.

7. The method of claim 1, comprising generating a first point sample for a first one of the images and a second point sample for the first one of the images.

8. The method of claim 7, comprising first and second management zone layers, the first management zone layer includes the first point sample, and the second management zone layer includes the second point sample.

9. The method of claim 1, wherein each one of the point samples identifies the presence of at least one weed species in the agricultural field.

10. A method of weed management in an agricultural field, comprising:
   processing images of the agricultural field that have been obtained by an unmanned aerial vehicle to identify weed species in each image; the images that are processed are images that have been obtained by the unmanned aerial vehicle flying over the field, and the agricultural field has a total area that is greater than a total area covered by the images;
   generating a first management zone layer for a first identified weed specie;
   generating a second management zone layer for a second identified weed specie different from the first identified weed specie;
   storing the first and second management zone layers in at least one non-transitory computer readable storage medium.

11. The method of claim 10, further comprising developing a first treatment plan for the first management zone layer to treat the first identified weed specie, and developing a second treatment plan for the second management zone layer to treat the second identified weed specie.

12. An agricultural zone management system, comprising:
   an unmanned aerial vehicle that is controlled to fly in a flight pattern over an agricultural field to obtain a plurality of images, wherein the flight pattern comprises a mapping flight pattern that obtains a full set of images of the field wherein the agricultural field has a total area that is approximately equal to a total area covered by the full set of images; and
   a plurality of management zones stored in a non-transitory computer readable storage medium, each management zone encompassing at least one point sample of the agricultural field, where each point sample is generated from a corresponding one of the images.

13. An agricultural zone management system, comprising:
   an unmanned aerial vehicle that is controlled to fly in a flight pattern over an agricultural field to obtain a plurality of images, wherein the flight pattern comprises a grid spot flight pattern or a points of interest spot flight pattern, and the images are spot images wherein the agricultural field has a total area that is greater than a total area covered by the spot images; and
   a plurality of management zones stored in a non-transitory computer readable storage medium, each management zone encompassing at least one point sample of the agricultural field, where each point sample is generated from a corresponding one of the images.

14. The agricultural zone management system of claim 12, further comprising at least one processor separate from the unmanned aerial vehicle that is configured to: process the images and generate the point samples, and generate the management zones from the point samples.

15. The agricultural zone management system of claim 14, wherein the processor generates the management zones using Voronoi tessellation or using an interpolation method.

16. A method of weed management in an agricultural field, comprising:
   processing images of the agricultural field that have been obtained by an unmanned aerial vehicle to identify weed species in each image; the images that are processed are images that have been obtained by the unmanned aerial vehicle flying over the field; the images are obtained by flying the unmanned aerial vehicle in a mapping flight pattern to obtain a full set of images of the field wherein the agricultural field has a total area that is approximately equal to a total area covered by the full set of images;
   generating a first management zone layer for a first identified weed specie;
   generating a second management zone layer for a second identified weed specie different from the first identified weed specie;
   storing the first and second management zone layers in at least one non-transitory computer readable storage medium.

* * * * *